US012153854B1

(12) United States Patent
Palacios

(10) Patent No.: US 12,153,854 B1
(45) Date of Patent: Nov. 26, 2024

(54) ANIMATION OF HAND-FINGER COMMUNICATOR WITH REAL-WORLD VOICE OUTPUT

(71) Applicant: Sony Interactive Entertainment Inc., Tokyo (JP)

(72) Inventor: Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/199,174

(22) Filed: May 18, 2023

(51) Int. Cl.
*G06F 3/01* (2006.01)
*G02B 27/00* (2006.01)
*G02B 27/01* (2006.01)
*G06F 3/16* (2006.01)
*G06T 13/40* (2011.01)
*G06T 17/20* (2006.01)
*G06V 40/16* (2022.01)
*G06V 40/20* (2022.01)

(52) U.S. Cl.
CPC ........... *G06F 3/16* (2013.01); *G02B 27/0093* (2013.01); *G02B 27/0101* (2013.01); *G02B 27/017* (2013.01); *G06F 3/013* (2013.01); *G06F 3/017* (2013.01); *G06T 13/40* (2013.01); *G06T 17/20* (2013.01); *G06V 40/166* (2022.01); *G06V 40/174* (2022.01); *G06V 40/176* (2022.01); *G06V 40/20* (2022.01); *G06V 40/28* (2022.01); *G02B 2027/0138* (2013.01); *G02B 2027/014* (2013.01)

(58) Field of Classification Search
CPC ....... G06T 13/40; G06T 19/006; G06T 17/20; G06T 2207/30196; G02B 27/017; G02B 2027/0138; G02B 27/0093; G06F 3/017; G06F 3/013; G06V 40/168; G06V 40/174; G06V 40/176; G06V 40/20; G06V 40/28; G09G 2354/00
See application file for complete search history.

(56) References Cited

U.S. PATENT DOCUMENTS

| 11,107,261 | B2 * | 8/2021 | Scapel | G06V 40/166 |
| 11,295,502 | B2 * | 4/2022 | Fang | G06V 40/176 |
| 11,503,377 | B2 * | 11/2022 | Zhang | H04N 21/8146 |
| 11,907,412 | B2 * | 2/2024 | Silverstein | A63F 13/211 |

(Continued)

*Primary Examiner* — Dismery Mercedes
(74) *Attorney, Agent, or Firm* — PENILLA IP, APC

(57) ABSTRACT

A method for communicating with users in a virtual reality space includes capturing images of a user during a session of interaction in the virtual reality space, with the captured images including hand gestures and facial expressions made by the user during a communication act. The method also includes processing state data generated during the session, to identify a context associated with the virtual reality space during the communication act. The method further includes generating an audio output representing an interpretation of the hand gestures and facial expressions. The audio output includes sound modifications that are dynamically applied based on the context of virtual reality space. Still further, the method includes presenting the audio output in the virtual reality space via an avatar of the user. The face of the avatar is correspondingly modified with a video overlay associated with the sound modifications, which update during the communication act.

18 Claims, 4 Drawing Sheets

(56) References Cited

U.S. PATENT DOCUMENTS

| | | | |
|---|---|---|---|
| 2007/0260984 A1* | 11/2007 | Marks | A63F 13/65 |
| | | | 715/706 |
| 2008/0215974 A1* | 9/2008 | Harrison | H04L 67/131 |
| | | | 715/706 |
| 2013/0187929 A1* | 7/2013 | Perez | A63F 13/213 |
| | | | 345/473 |
| 2015/0281309 A1* | 10/2015 | Li | H04N 21/4341 |
| | | | 709/217 |
| 2016/0123758 A1* | 5/2016 | Benzaia | H04N 7/185 |
| | | | 701/538 |
| 2016/0134840 A1* | 5/2016 | McCulloch | G06V 40/165 |
| | | | 348/14.03 |
| 2016/0350609 A1* | 12/2016 | Mason | G06T 15/20 |
| 2017/0185148 A1* | 6/2017 | Kondo | G06F 3/0346 |
| 2019/0043239 A1* | 2/2019 | Goel | G06T 13/205 |
| 2019/0080519 A1* | 3/2019 | Osman | H04N 13/383 |
| 2020/0175739 A1* | 6/2020 | Meister | G06F 3/017 |
| 2020/0410739 A1* | 12/2020 | Shin | G06F 18/253 |
| 2021/0105438 A1* | 4/2021 | Tong | H04M 1/72439 |
| 2021/0321070 A1* | 10/2021 | Messingher Lang | H04N 9/802 |

* cited by examiner

ANIMATION OF HAND-FINGER COMMUNICATOR WITH REAL-WORLD VOICE OUTPUT

During gameplay, video game players sometimes have view windows that show other players. These view windows enable the game players to see one another and to communicate with one another regarding strategy and/or team play. In the case of faster-paced games, e.g., strategic games, target games, and drama games, experienced players use gestures to transmit information such as instructions, warnings, and the like, to other players quickly and efficiently. If a player, e.g., a new player or a player with relatively little experience, does not understand the meaning of these gestures, then the player can be at a competitive disadvantage in the game.

Gestures are also used to communicate in other digital environments such as a virtual reality space, a metaverse, and the like. In such digital environments, communication difficulties can arise if a participant does not understand the meaning of a gesture being used by another participant. Further, in some situations gestures evolve over time and result in the generation of new gestures. In other situations, existing gestures are replaced by new gestures based on game context, demographics, and/or experience.

It is in this context that embodiments arise.

SUMMARY

In an example embodiment, a method for communicating with users in a virtual reality space is provided. The method includes capturing images of a user during a session of interaction in the virtual reality space, with the captured images of the user including hand gestures and facial expressions made by the user during a communication act. The method also includes processing state data generated during the session, with the state data used to identify a context associated with the virtual reality space during the communication act. The method further includes generating an audio output representing an interpretation of the hand gestures and facial expressions, where the audio output includes sound modifications that are dynamically applied based on the context of virtual reality space during the communication act. Still further, the method includes presenting the audio output in the virtual reality space via an avatar of the user. The face of the avatar of the user is correspondingly modified with a video overlay associated with the sound modifications, and the sound modifications update during the communication act.

In one embodiment, the interpretation of the of the hand gestures and facial expressions made by the user includes processing using an interpretive learning model that uses the hand gestures and facial expressions made by the user and the context associated with the virtual reality space. In one embodiment, the hand gestures made by the user include interactions with a controller used by the user, with the interactions with the controller causing spatial and inertial motion of the controller. The spatial and inertial motion of the controller is detected using an inertial sensor of the controller.

In one embodiment, the captured images of the user are captured using a camera, and the captured images are used to detect spatial movement of the user's hands as the user makes hand gestures during the communication act. In one embodiment, the camera is integrated into a head mounted display that performs inside-out tracking of the hand gestures made by the user, or the camera is placed in a real-world space having a point of view directed toward the user. In one embodiment, a second camera of the head mounted display performs eye tracking, with the eye tracking being used to identify the facial expressions made by the user during the communication act. In one embodiment, a third camera of the head mounted display performs mouth tracking, with the mouth tracking being used to identify the facial expressions made by the user during the communication act.

In one embodiment, the sound modifications change the audio output so that the interpretation of the communication act is substantially consistent with a context of the interaction occurring in the virtual reality space. In one embodiment, the video overlay associated with the sound modifications has a mood template, and the mood template includes one of a happy mood, an excited mood, a rushed mood, a sad mood, an unhappy mood, or a stressed mood. In one embodiment, the video overlay associated with the sound modifications is implemented by manipulating a mesh of a three-dimensional model of the face of the avatar.

In another example embodiment, a non-transitory computer readable medium containing program instructions for communicating with users in a virtual reality space is provided. The execution of the program instructions by one or more processors of a computer system causes the one or more processors to carry out the operations of capturing images of a user during a session of interaction in the virtual reality space, with the captured images of the user including hand gestures and facial expressions made by the user during a communication act, processing state data generated during the session, with the state data being used to identify a context associated with the virtual reality space during the communication act, generating an audio output representing an interpretation of the hand gestures and facial expressions, where the audio output includes sound modifications that are dynamically applied based on the context of virtual reality space during the communication act, and presenting the audio output in the virtual reality space via an avatar of the user. A face of the avatar of the user is correspondingly modified with a video overlay associated with the sound modifications, and the sound modifications update during the communication act.

In one embodiment, the interpretation of the of the hand gestures and facial expressions made by the user includes processing using an interpretive learning model that uses the hand gestures and facial expressions made by the user and the context associated with the virtual reality space. In one embodiment, the hand gestures made by the user include interactions with a controller used by the user, with the interactions with the controller causing spatial and inertial motion of the controller. The spatial and inertial motion of the controller is detected using an inertial sensor of the controller.

In one embodiment, the captured images of the user are captured using a camera, and the captured images are used to detect spatial movement of the user's hands as the user makes hand gestures during the communication act. In one embodiment, the camera is integrated into a head mounted display that performs inside-out tracking of the hand gestures made by the user, or the camera is placed in a real-world space having a point of view directed toward the user. In one embodiment, a second camera of the head mounted display performs eye tracking, with the eye tracking being used to identify the facial expressions made by the user during the communication act. In one embodiment, a third camera of the head mounted display performs mouth tracking, with the mouth tracking being used to identify the facial expressions made by the user during the communication act.

In one embodiment, the sound modifications change the audio output so that the interpretation of the communication act is substantially consistent with a context of the interaction occurring in the virtual reality space. In one embodiment, the video overlay associated with the sound modifications has a mood template, and the mood template includes one of a happy mood, an excited mood, a rushed mood, a sad mood, an unhappy mood, or a stressed mood. In one embodiment, the video overlay associated with the sound modifications is implemented by manipulating a mesh of a three-dimensional model of the face of the avatar.

Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method for communicating with users in a virtual reality space. While a user engages in a session of interaction in a virtual reality space, images of the user are captured. The captured images include hand gestures and facial expressions made by the user during a communication act. The state data generated during the session of interaction in the virtual reality space is processed to identify the context associated with virtual reality space during the communication act. The hand gestures and facial expressions made by the user during the communication act are interpreted by, for example, processing using an interpretive learning model that uses the hand gestures and facial expressions made by the user as well as the context associated with the virtual reality space. An audio output that represents the interpretation of the hand gestures and facial expressions is generated, with the audio output including sound modifications that are dynamically applied based on the context of the virtual reality space during the communication act and that are updated during the communication act. The audio output is presented in the virtual reality space via an avatar of the user, and the face of the avatar of the user is correspondingly modified with a video overlay associated with the sound modifications made to the audio output.

Figure 1:
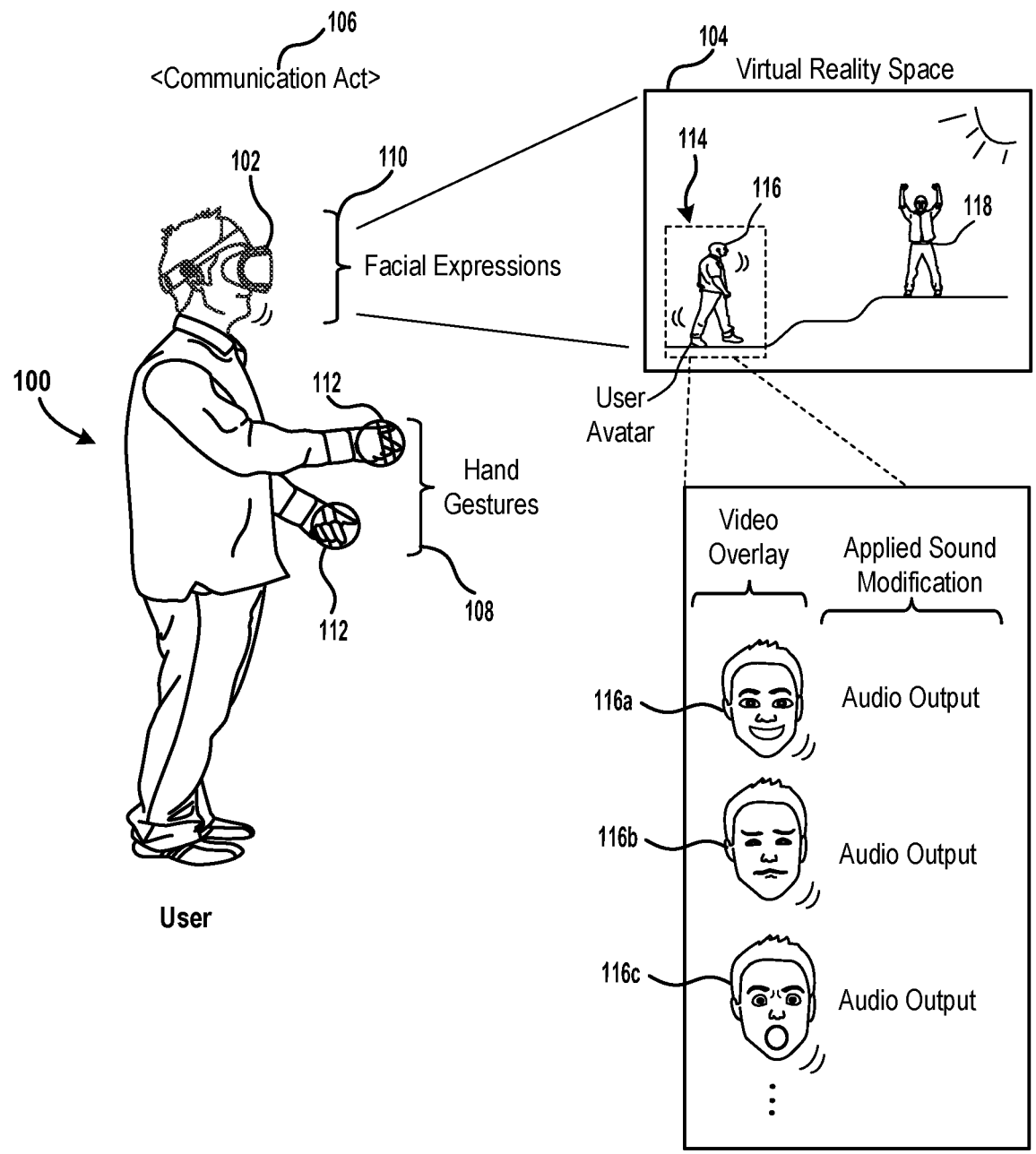
FIG. 1 is a simplified schematic diagram that illustrates a user during a session of interaction in a virtual reality space, in accordance with one embodiment.

FIG. 1 is a simplified schematic diagram that illustrates a user during a session of interaction in a virtual reality space, in accordance with one embodiment. As shown in FIG. 1, user 100 is wearing head mounted display (HMD) 102 during a session of interaction in virtual reality space 104, which is displayed to the user on a display within the HMD, e.g., a display panel (HMDs typically include one or two display panels). In one embodiment, user 100 engages in a communication act 106 in which the user makes hand gestures 108 and facial expressions 110. During the communication act 106, images of the user 100 are captured by one or more cameras and the captured images include the hand gestures 108 and the facial expressions 110 made by the user during the session of interaction.

In one embodiment, images of the hand gestures 108 can be captured by a camera integrated into the HMD 102 which performs inside-out tracking of the hand gestures. In another embodiment, images of the hand gestures 108 can be captured by a camera placed in a real-world space having a point of view directed toward the user 100 with the camera performing outside-in tracking of the hand gestures. The captured images can be used to detect spatial movement of the user's hands as the user 100 makes hand gestures 108 during the communication act 106. The hand gestures 108 made by user 100 can include controller interactions made while the user's hands are engaged with handheld controllers 112. The spatial and inertial motion caused by the controller interactions can be detected using an inertial sensor of the controllers 112 being used by user 100. The hand gestures 108 made by user 100 also can include finger movements made while the user's hands are engaged with controllers 112, e.g., finger movements made by releasing one or more fingers from the controller. By way of example, user 100 can make a hand gesture 108 by releasing two fingers from controller 112 to form a "V" sign. In one embodiment, tracking of the finger movements can be achieved using capacitive sensors on the controllers 112, or other forms of proximity sensors.

Images of the facial expressions 110 made by the user 100 during communication act 106 can be captured using inward-facing cameras that are integrated in the HMD 102. In one embodiment, one camera of the HMD 102 performs eye tracking that is used to identify the facial expressions 110 made by the user 100 during the communication act 106. In one embodiment, another camera of the HMD 102 performs mouth tracking that is used to identify the facial expressions 110 made by the user 100 during the communication act 106.

State data generated during the session of interaction in the virtual reality space 104 is processed to identify a context associated with the virtual reality space during the communication act 106. Additional details regarding the processing of the state data to identify the context associated with the virtual reality space 104 during the communication act 106 are described below with reference to FIG. 2. An interpretation of the hand gestures 108 and the facial expressions 110 made by user 100 during the communication act 106 is formulated and an audio output representing this interpretation is generated. In one embodiment, the interpretation of the hand gestures 108 and the facial expressions 110 made by the user 100 includes processing using an interpretive learning model that uses the hand gestures and facial expressions made by the user and the context associated with the virtual reality space 104. Additional details regarding the processing using the interpretive learning model are described below with reference to FIG. 3B. In one embodiment, the audio output includes sound modifications that are dynamically applied based on the context of the virtual reality space 104 during the communication act 106.

As shown in FIG. 1, the audio output is presented in virtual reality space 104 via user avatar 114. The user avatar 114 has a face 116, which is modified with a video overlay associated with the sound modifications applied to the audio output, as will be explained in more detail below. In one example embodiment, user avatar 114 is walking on a path in virtual reality space 104 toward person 118. When user 100 realizes that person 118 might be blocking the path, the user begins to make a waving motion by repeatedly moving his hands to the right in a calm manner. As the user 100 makes the waving motion with his hands, his eyebrows are slightly raised and he is smiling. In this moment, the hand gestures and the facial expressions made by the user 100 will be interpreted as signaling the person 118 to move out of the way and the audio output "Move out of the way, please" will be generated. Further, in light of the context associated with the virtual reality space 104, namely two people pleasantly interacting on a path, the video overlay 116a for the face 116 of user avatar 114 will reflect a happy mood and the sound modification applied to the audio output will provide the audio output with a pleasant tone.

In this example embodiment, as user avatar 114 continues to walk on the path in virtual reality space 104 toward person 118, the person does not move out of the way and continues to block the path. This causes the user 100 to become unhappy and, consequently, the user begins to make a more vigorous waving motion by repeatedly moving his hands to the right in a more excited manner. As the user 100 makes the waving motion with his hands, his eyebrows are lowered and his lips are tightened. In this moment, the hand gestures and facial expressions made by the user 100 will be interpreted as signaling the person 118 to urgently get out of the way and the audio output "Get out of the way" will be generated. Further, in light of the context associated with the virtual reality space 104, namely two people interacting on a path in a mildly heated manner, the video overlay 116b for the face 116 of user avatar 114 will reflect an unhappy mood and the sound modification applied to the audio output will provide the audio output with a harsh tone.

Continuing with the example embodiment, as user avatar 114 continues to walk on the path in virtual reality space 104, the person 118 raises his arms and begins walking toward user avatar 114. In response, the user 100 stops walking and extends his arms toward the person 118 with his palms facing outward. As the user 100 extends his arms in this manner, the user's eyebrows are raised, the user's eyes are open wide, and the user's mouth is open. In this moment, the hand gestures and facial expressions made by user 100 will be interpreted as signaling to person 118 that the user is not interested in confronting the person and the audio output "Okay, I'm getting out of here" will be generated. Further, in light of the context associated with the virtual reality space 104, namely one person aggressively approaching another person, the video overlay 116c for the face 116 of user avatar 114 will reflect a fearful or scared mood and the sound modification applied to the audio output will provide the audio output with a distressed tone.

Figure 2:
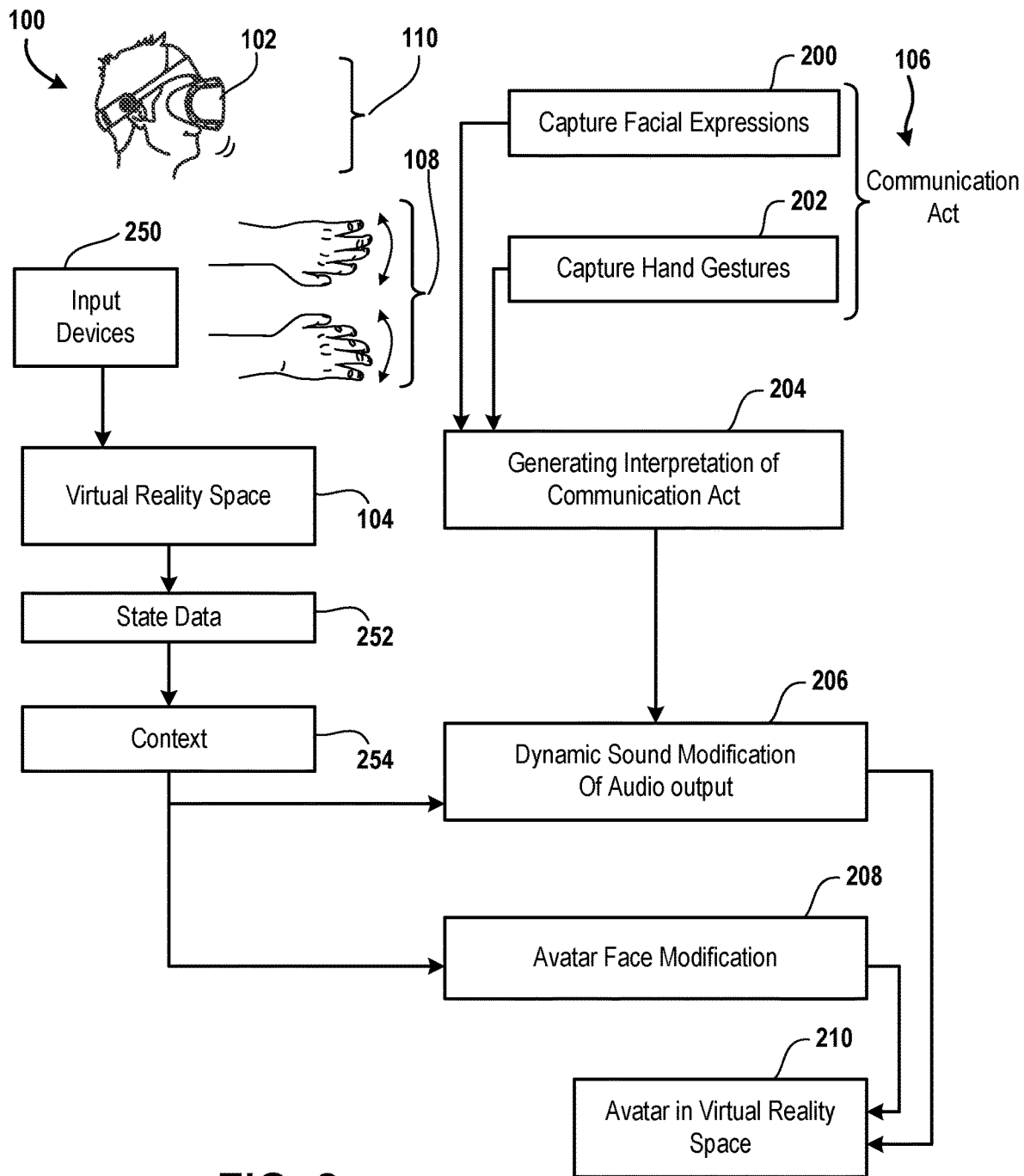
FIG. 2 is a simplified flow diagram that illustrates a method for communicating with users in a virtual reality space, in accordance with one embodiment.

FIG. 2 is a simplified flow diagram that illustrates a method for communicating with users in a virtual reality space, in accordance with one embodiment. As described above in connection with the description of FIG. 1, user 100 engages in a communication act 106 in which the user makes hand gestures 108 and facial expressions 110. As shown in FIG. 2, in operation 200 facial expressions of a user are captured during a session of interaction in a virtual reality space. In one embodiment, such as, for example, the embodiment shown in FIG. 1, user 100 wears a head mounted display (HMD) 102 which includes inward-facing cameras that are integrated into the HMD. The inward-facing cameras integrated into HMD 102 can capture images of facial expressions 110 made by the user 100 during the session of interaction in virtual reality space 104. In one embodiment, one camera of the HMD 102 captures images of the user 100's eyes (eye tracking) and another camera of the HMD captures images of the user's mouth (mouth tracking).

In operation 202, hand gestures of a user are captured during a session of interaction in a virtual reality space. In one embodiment, such as, for example, the embodiment shown in FIG. 1, images of hand gestures 108 made by user 100 are captured by a camera integrated into HMD 102 worn by the user to perform inside-out tracking of the hand gestures. In another embodiment, images of the hand gestures 108 made by user 100 are captured by a camera located in a real-world space having a point of view directed toward the user to perform outside-in tracking of the hand gestures. The captured images can be used to detect spatial movement of the user's hands as the user 100 makes hand gestures 108, as described above with reference to FIG. 1. The hand gestures 108 also can includes controller interactions made while the user's hands are engaged with handheld controllers, e.g., the handheld controllers 112 shown in FIG. 1. The spatial and inertial motion caused by the controller interactions can be detected using an inertial sensor of the controllers being used by the user. In one embodiment, the hand gestures 108 made by the user 100 include finger movements made while the user's hands are engaged with the controllers. The finger movements can include finger movements associated with pressing and releasing one or more buttons/triggers of a controller as well as finger movements associated with releasing one or more fingers from a controller. In one embodiment, the tracking of the finger movements is achieved using capacitive sensors on the controllers.

With continuing reference to FIG. 2, the input received from input devices 250 is used to control the user's avatar in virtual reality space 104, e.g., user avatar 114 shown in FIG. 1. In one embodiment, the input devices 250 include one or all of the following input devices: cameras integrated into HMD 102; a camera located in a real-world space having a point of view directed toward the user 100; inertial sensors situated on the controllers; and capacitive sensors on the controllers. As the user avatar 114 (see FIG. 1) interacts in the virtual reality space 104, state data 252 is continuously collected and stored in memory. This state data 252 provides a stream of metadata descriptive of what is happening as the user avatar 114 interacts in the virtual reality space 104. The state data 252 is processed to identify a context 254 associated with the virtual reality space 104 as the user avatar 114 interacts in the virtual reality space, e.g., the user 100 engages in communication act 106 in the virtual reality space via the user avatar. In one embodiment, the processing of the state data 252 includes first analyzing the state data to determine what period of time is relevant to the communication act 106, and then analyzing the state data from the relevant period of time to identify the context 254 associated with the virtual reality space 104 during the communication act. By way of example, the period of time relevant to the communication act 106 could be a matter of seconds, e.g., 5 or 10 seconds, a matter of minutes, e.g., 5 or 10 minutes, or even longer. In one embodiment, the state data 252 is analyzed using machine learning.

In operation 204, an interpretation of the communication act 106, which includes the hand gestures 108 and facial expressions 110 made by the user 100 during the communication act, is generated. In one embodiment, the generation of the interpretation of the communication act includes processing an interpretive learning model to determine the meaning of the hand gestures 108 and facial expressions 110 made by the user 100. As will be explained in more detail below with reference to FIG. 3B, the interpretive learning model pieces together features captured from the user 100 to identify what the hand gestures 108 and facial expressions 110 made by the user are trying to say. In one embodiment, the interpretive learning model is a deep learning model that takes the gesture features and facial features captured from the user and, using deep learning algorithms, conducts deep learning node processing in which mathematics is applied to identify clusters, similarities, and patterns. During this processing, the interpretive learning model creates feature nodes and unique strengths between the various feature nodes that can be used to determine the meaning of the hand gestures 108 and facial expressions made by the user 100. As the user engages in more communication acts in the virtual reality space, the strengths between some of the feature nodes can increase or decrease. The strengths between some of the feature nodes also can increase or decrease via reinforced learning, e.g., when positive or negative feedback is received. Generally speaking, the interpretive learning model becomes more refined by training, whereby the training itself is a continuous process that improves over time with more use.

In one embodiment, once the processing of the interpretive learning model has been completed, a text file representing the interpretation of the hand gestures 108 and facial expressions 110 is generated. By way of example, in the event the interpretive learning model determines that the hand gestures and facial expressions should be interpreted as the user saying "Move out of the way, please," then a text file including this interpretation in text format will be generated. This text file can then be processed to convert the text version of the interpretation of the hand gestures and facial expressions into an audio version of this interpretation, with the audio version being stored in an appropriate sound file, e.g., a WAV file, an MP3 file, an M4A file, etc. In one embodiment, the audio version of the interpretation of the hand gestures and facial expressions is generated using a standard-sounding voice which can be selected based on relevant information in the user's profile. In another embodiment, the audio version of the interpretation is generated using a voice which sounds similar to the user's voice. In this embodiment, the similar-sounding voice can be selected based on comparison of the available voice options with a sample of the user's voice.

In operation 206, sound modifications are made to the audio output which represents the interpretation of the hand gestures and facial expressions made by the user. In one embodiment, the sound modifications are dynamically applied to the audio output based on the context 254 of the context of the interaction in the virtual reality space 104 during the communication act 106. In the example in which the audio version of the interpretation of the hand gestures and facial expressions is stored in a sound file, e.g., a WAV file, an MP3 file, an M4A file, etc., the audio output can be modified by changing the sound file to change the volume (louder or softer), the pace (faster or slower), the pitch (higher or lower), the inflection (upward or downward), and/or the tone (formal, informal, humorous, cheerful, harsh, etc.) of the audio output. In this manner, the sound file can be changed so that the audio output representing the interpretation is substantially consistent with the context of the interaction occurring in the virtual reality space. Thus, by way of example, if the interaction in the virtual reality space is taking place in a cheerful environment, then the audio output can be modified to reflect that the user is in a happy mood. On the other hand, if the interaction in the virtual reality space is taking place in a stressful environment, then the audio output can be modified to reflect that the user is in a mood consistent with the stressful environment, e.g., a stressed mood, a rushed mood, an excited mood, an unhappy mood, a fearful mood, or a sad mood.

In operation 208, the face of the avatar of the user is modified. The face of the avatar can be modified either by replacing the face or by manipulating the configuration of the face, as will be explained in more detail below. In one embodiment, the face of the avatar of the user, e.g., face 116 of user avatar 114 shown in FIG. 1, is modified to be consistent with the context 254 of the interaction in the virtual reality space 104. In one embodiment, the face of the avatar is modified using a video overlay that is placed over the face of the avatar so that the video overlay replaces the face of the avatar. The video avatar is configured to be dynamically adjusted and smoothed to blend in with the avatar's facial features, skin tone, and other graphical properties. In this embodiment, the video overlay can be any image, animation, or video clip suitable for use as the face of the avatar.

In another embodiment, the face of the avatar is modified using a video overlay that is implemented by manipulating the three-dimensional (3D) geometry (model) of the face of the avatar. By way of example, the mesh of the 3D model of the face of the avatar can be manipulated to express emotions, e.g., a happy mood, an unhappy mood, etc. The 3D animations of the video overlay associated with the mesh of the face can be either predefined and/or adjusted in real time based on the hand gestures and facial expressions of the user.

In one embodiment, the video overlay is associated with the sound modifications made to the audio output, e.g., the sound modifications made in operation 206. Thus, by way of example, if the sound modification reflects that the user in a happy mood, then the video overlay can include facial features that are consistent with a happy mood, e.g., lip corners raised diagonally (a smile), cheeks raised, and crow's feet wrinkles around the eyes. On the other hand, if the sound modification reflects that the user is in an unhappy mood, then the video overlay can include facial features that are consistent with an unhappy mood, e.g., lip corners pulled down (a frown) and inner corners of eyebrows raised. In one embodiment, the video overlay has a mood template that includes faces having facial features that reflect a number of moods including, by way of example, a happy mood, an excited mood, a rushed mood, a sad mood, an unhappy mood, a fearful mood, and a stressed mood.

In operation 210, the avatar is displayed in the virtual reality space. In one embodiment, as shown in FIG. 1, user avatar 114 presents the audio output, as dynamically modified, in the virtual reality space 104. In this embodiment, the face 116 of the user avatar 114 is correspondingly modified by a video overlay, e.g., one of video overlays 116a, 116b, and 116c, that is associated with the sound modification applied to the audio output. By way of example, in the case in which the sound modification applied to the audio output reflects a happy mood, the video overlay 116a having facial features consistent with a happy mood can be used to modify the face 116 of the user avatar 114. In the case in which the sound modification applied to the audio output reflects an unhappy mood, the video overlay 116b having facial features consistent with an unhappy mood can be used to modify the face 116 of the user avatar 114. In the case in which the sound modification applied to the audio output reflects a fearful or scared mood, the video overlay 116c having facial features consistent with a fearful or scared mood can be used to modify the face 116 of the user avatar 114. Those skilled in the art will appreciate that video overlays other than the exemplary video overlays 116a, 116b, and 116c shown in FIG. 1 also can be used. For example, video overlays having facial features consistent with other moods, e.g., excited moods, sad moods, rushed moods, stressed moods, etc., can be used when the sound modification applied to the audio output reflects such moods.

Figure 3A:
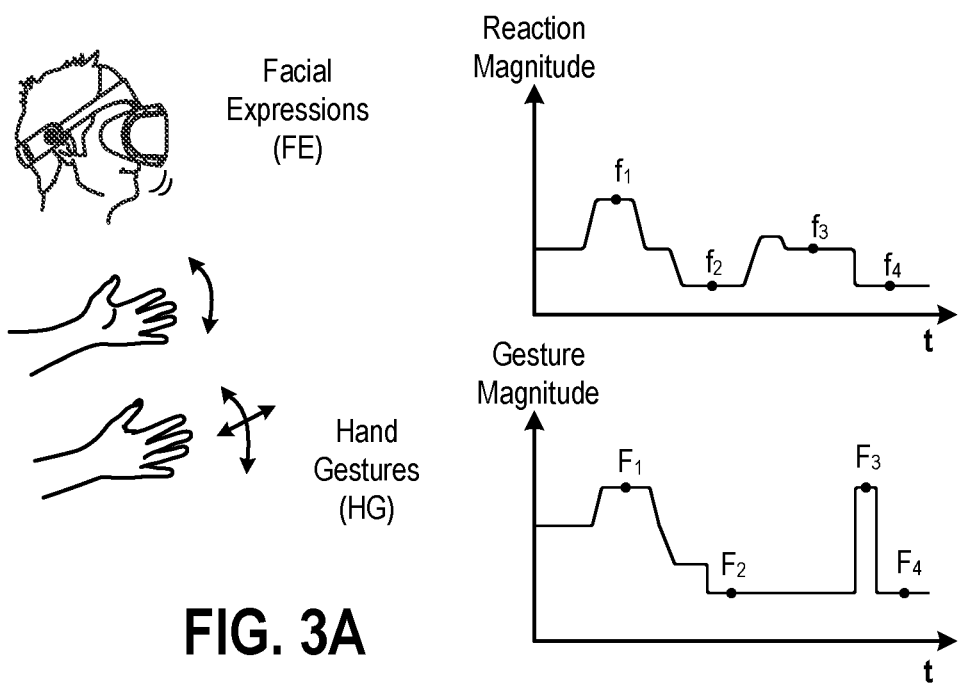
FIG. 3A shows a first graph regarding facial expressions over time and a second graph regarding hand gestures over time.

FIG. 3A shows a first graph regarding facial expressions over time and a second graph regarding hand gestures over time. In particular, the first graph (the top graph in FIG. 3A) is a graph that shows the reaction magnitude of facial expression features versus time. The second graph (the bottom graph shown in FIG. 3A) is a graph that shows the gesture magnitude of hand gesture features versus time. In the first graph regarding facial expressions, the reaction magnitude of facial expression features is shown over time, including at points $f_1$, $f_2$, $f_3$, and $f_4$. At point $f_1$, the reaction magnitude of facial expression features is relatively high (relative to the reaction magnitudes at points $f_2$, $f_3$, and $f_4$). The facial expression features at point $f_1$ can include any combination of the facial expressions captured by one or more of the cameras, as described herein. In one embodiment, the facial expression features include an open or closed mouth, open eyes or squinting eyes, and raised eyebrows or lowered eyebrows. Thus, each point, e.g., each of points $f_1$, $f_2$, $f_3$, and $f_4$, can include multiple subfeatures associated with different parts of the face or specific subfeatures. In one embodiment, the reaction magnitude is the cumulative sum of the magnitudes of the facial expression features the user is displaying at a given point in time, e.g., open mouth, open eyes, and raised eyebrows, with the magnitude of a facial expression feature being a function of the degree to which the feature is being displayed. For example, in this embodiment, a wide open mouth is accorded a higher magnitude than a partially open mouth, wide open eyes are accorded a higher magnitude than squinting eyes, etc. In addition, in determining the cumulative sum of the magnitudes at a given point in time, certain features can be given more weight than other features. By way of example, in one embodiment, the open/closed mouth feature is weighted more heavily than open/squinting eyes feature. As can be seen in the first graph, the reaction magnitude of the facial expression features changes over time as reflected by the relative locations of points $f_1$, $f_2$, $f_3$, and $f_4$ on the curve. The slope of the curve reflects the speed at which the reaction magnitude changes with time. For example, between point $f_1$ and point $f_2$, the reaction magnitude decreases steadily from the level of point $f_1$ to an intermediate level, briefly stays at the intermediate level, and then decreases steadily to the level of point $f_2$. Between point $f_2$ and point $f_3$, the reaction magnitude rapidly increases from the level of point $f_2$ to the level of point $f_3$ and then remains at that level for a period of time. Between point $f_3$ and point $f_4$, the reaction magnitude rapidly decreases from the level of point $f_3$ to the level of point $f_4$ and then remains at that level for a period of time.

In the second graph regarding facial expressions (the bottom graph in FIG. 3A), the gesture magnitude of hand gesture features is shown over time, including at points $F_1$, $F_2$, $F_3$, and $F_4$. At point $F_1$, the gesture magnitude of hand gesture features is relatively high relative to the gesture magnitudes at points $F_2$ and $F_4$ and is slightly higher than the gesture magnitude at point $F_3$. The hand gesture features at point $F_1$ can include any combination of the hand gestures captured by the cameras and sensors, as described herein. In one embodiment, the hand gesture features include the motion of the moving hands and the speed at which the hands are being moved. By way of example, the motion of the moving hands can be waving, pointing, grasping, squeezing, clapping, making a fist, and moving fingers and/or thumbs, e.g., to make signs such as the victory sign or the thumbs up sign. Thus, each point, e.g., each of points $F_1$, $F_2$, $F_3$, and $F_4$, can include multiple subfeatures associated with different aspects of a gesture or specific subfeatures. In one embodiment, the gesture magnitude is the cumulative sum of the magnitudes of the hand gesture features the user is displaying at a given point in time, e.g., waving hands at a rapid pace, with the magnitude of a hand gesture feature being a function of the degree to which the feature is being displayed. For example, in this embodiment, waving hands at a rapid pace is accorded a higher magnitude than waving hands at a slow pace, squeezing hard is accorded a higher magnitude than squeezing gently, etc. In addition, in determining the cumulative sum of the magnitudes at a given point in time, certain features can be given more weight than other features. By way of example, in one embodiment, the pointing feature is weighted more heavily than the squeezing feature. As can be seen in the second graph, the gesture magnitude of the hand gesture features changes over time as reflected by the relative locations of points $F_1$, $F_2$, $F_3$, and $F_4$ on the curve. The slope of the curve reflects the speed at which the gesture magnitude changes with time. For example, between point $F_1$ and point $F_2$, the gesture magnitude decreases steadily from the level of point $F_1$ to an intermediate level just above the level of point $F_2$, briefly stays at the intermediate level, and then decreases abruptly to the level of point $F_2$. Between point $F_2$ and point $F_3$, the gesture magnitude remains at the level of point $F_2$ for a period of time and then abruptly increases from the level of point $F_2$ to the level of point $F_3$. Between point $F_3$ and point $F_4$, the gesture magnitude remains at the level of point $F_3$ for a brief period of time and then abruptly decreases from the level of point $F_3$ to the level of point $F_4$ and then remains at that level for a period of time.

With continuing reference to FIG. 3A, a comparison of the relative locations of points $f_1$, $f_2$, $f_3$, and $f_4$ in the top graph and the relative locations of points $F_1$, $F_2$, $F_3$, and $F_4$ in the bottom graph indicates that there is a degree of correlation between the reaction magnitude of the facial expression features and the gesture magnitude of the hand gesture features. In general, it should be understood that many types of features can be extracted from both the facial expressions and the hand gestures, and the extraction can be customized to focus more or less on some features or subfeatures than others, based on the environment in which the interaction is to occur.

Figure 3B:
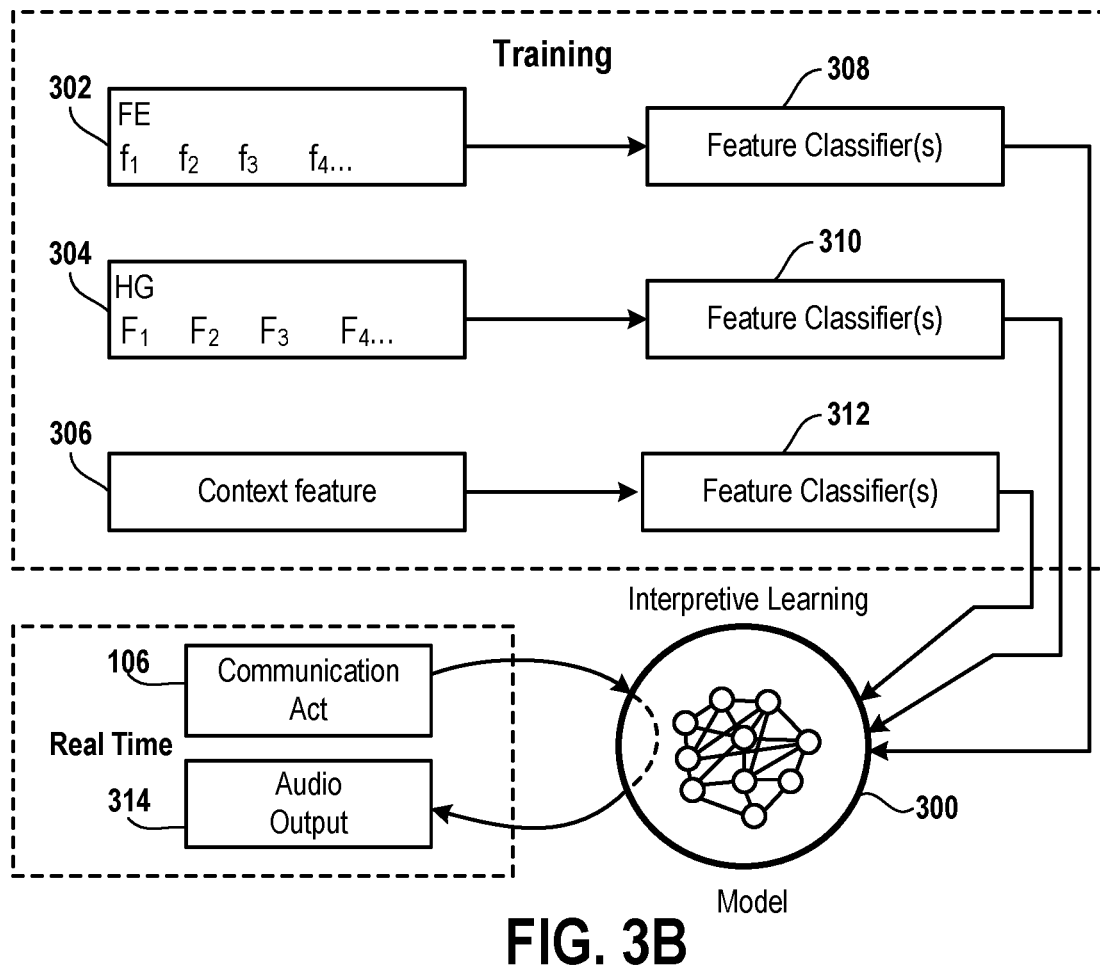
FIG. 3B is a simplified schematic diagram that illustrates a communication process in which an interpretive learning model is used to interpret a communication act including hand gestures and facial expressions, in accordance with one embodiment.

FIG. 3B is a simplified schematic diagram that illustrates a communication process in which an interpretive learning model is used to interpret a communication act including hand gestures and facial expressions, in accordance with one embodiment. As shown in FIG. 3B, facial expression feature extractor 302 extracts facial expression features from the facial expressions made by the user during a communication act, e.g., facial expressions 110 shown in FIG. 1. The facial expressions can be captured by cameras, as described herein. In one embodiment, the extracted facial expression features include an open or closed mouth, open eyes or squinting eyes, and raised eyebrows or lowered eyebrows. The hand gesture feature extractor 304 extracts hand gesture features from the hand gestures made by the user during a communication act, e.g., hand gestures 108 shown in FIG. 1. The hand gestures can be captured by cameras and sensors, as described herein. In one embodiment, the extracted hand gesture features include the motion of moving hands, e.g., waving, pointing, grasping, etc., and the speed at which the hands are being moved. The context feature extractor 306 scans the state data collected during an interaction in a virtual reality space, e.g., as user avatar 114 interacts in virtual reality space 104 as shown in FIG. 1, and extracts context features related to what is happening in the virtual reality space. In one embodiment, the context features include a cheerful (happy) environment, an unhappy environment, a stressful environment, a hostile environment, an excited environment, a sad environment, a fearful (scared) environment, etc.

The features extracted by facial expression feature extractor 302, hand gesture feature extractor 304, and context feature extractor 306 are then labeled for use in the interpretive learning model 300 by feature classifiers 308, 310, and 312, respectively. Each of the classifiers 308-312 adds an appropriate label to each extracted feature which is considered useful for training the interpretive learning model 300. Thus, not all extracted features are assigned a label by the various classifiers.

In one embodiment, feature classifier 308 looks at the features extracted by facial expression feature extractor 302 and adds an appropriate label to each feature which is considered useful for training the interpretive learning model 300. In one embodiment, feature classifier 308 is a piece of code that looks at the features extracted by facial expression feature extractor 302 and adds a predefined label to those features considered useful for training the interpretive learning model 300, where the predefined label describes the nature of the facial expression feature. By way of example, if the facial expression feature relates to an open mouth, the predefined label for the feature could be "open mouth-full" if the mouth is fully open or "open mouth-partial" if the mouth is partially open.

In one embodiment, feature classifier 310 looks at the features extracted by hand gesture feature extractor 304 and adds an appropriate label to each feature which is considered useful for training the interpretive learning model 300. In one embodiment, feature classifier 310 is a piece of code that looks at the features extracted by hand gesture feature extractor 304 and adds a predefined label to those features considered useful for training the interpretive learning model 300, where the predefined label describes the nature of the hand gesture feature. By way of example, if the hand gesture feature relates to hands that are being waved, the predefined label for the feature could be "waving-fast" if the hands are being waved at a rapid pace or "waving-slow" if the hands are being waved at a slow pace.

In one embodiment, feature classifier 312 looks at the features extracted by context feature extractor 306 and adds an appropriate label to each feature which is considered useful for training the interpretive learning model 300. In one embodiment, feature classifier 312 is a piece of code that looks at the features extracted by context feature extractor 306 and adds a predefined label to those features considered useful for training the interpretive learning model 300, where the predefined label describes the nature of the context feature. By way of example, if the context feature relates to a cheerful (happy) environment, the predefined label for the feature could be "happy." On the other hand, if the context feature relates to an unhappy environment, the predefined label for the feature could be "unhappy."

The classified features (the extracted features to which a label has been added) generated by the feature classifiers 308-312 are fed into the interpretive learning model 300. In one embodiment, the interpretive learning model 300 is a deep learning model that takes the classified features for the user's communication acts in a virtual reality space and, using deep learning algorithms, conducts deep learning node processing in which mathematics is applied to identify clusters, similarities, and patterns. During this processing, the interpretive learning model 300 creates feature nodes and unique strengths between the various feature nodes that can be used to determine the meaning of the hand gestures and facial expressions made by the user. As more interactions occur in the virtual reality space, e.g., the user engages in more communication acts in the virtual reality space, the strengths between some of the feature nodes can increase or decrease. The strengths between some of the feature nodes also can increase or decrease via reinforced learning, e.g., when positive or negative feedback is received. Thus, the training of the interpretive learning model 300 is a continuous process. Consequently, as the interpretive learning model 300 receives more training, the model will become more refined and the results generated by the model will improve.

With continuing reference to FIG. 3B, in real time, when a user engages in a communication act 106 (see, for example, FIG. 1) during a session of interaction in a virtual reality space, the interpretive learning model 300 receives the hand gestures and facial expressions made by the user during the communication act as well as the context associated with the virtual reality space during the communication act. In one embodiment, the interpretive learning model 300 processes the hand gestures, facial expressions, and context using the feature nodes and strengths between the feature nodes developed during training of the model, which, as noted above, is a continuous process. This processing enables the interpretive learning model 300 to interpret the meaning of hand gestures and facial expressions made by the user during the communication act and to generate an audio output 314 that represents the interpretation of the hand gestures and facial expressions. In one embodiment, the audio output 314 includes sound modifications that are dynamically applied based on the context of the virtual reality space during the communication act, as described above with reference to FIG. 2.

Figure 4:
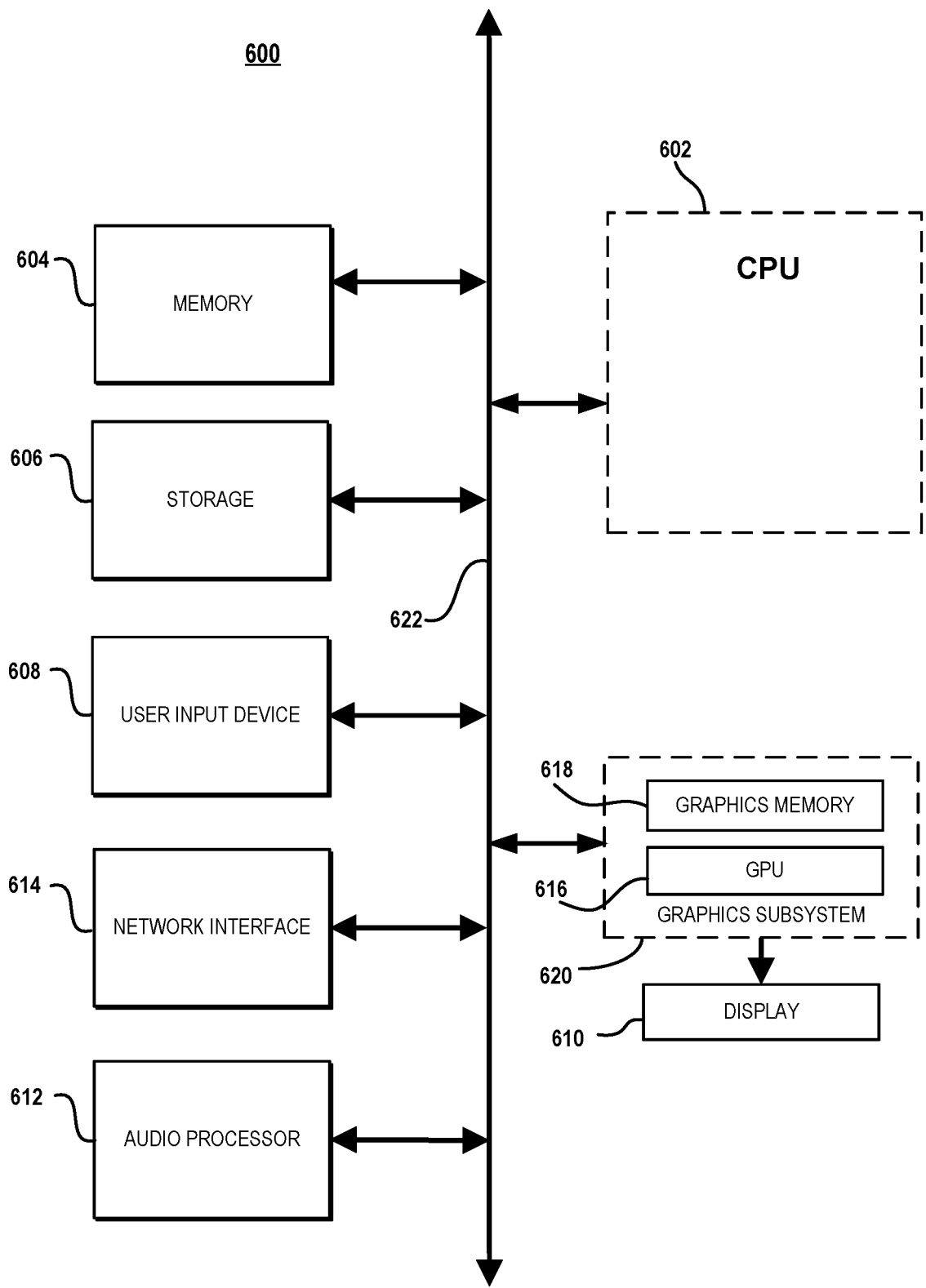
FIG. 4 illustrates components of an example device that can be used to perform aspects of the various embodiments of the present disclosure.

FIG. 4 illustrates components of an example device 600 that can be used to perform aspects of the various embodiments of the present disclosure. In particular, the block diagram of FIG. 4 illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be local to a player playing a game segment or a user interacting in a virtual reality space (e.g., game console), or remote from the player or user (e.g., back-end server processor), or one of many servers using virtualization in a game cloud system for remote streaming of gameplay to clients or in a cloud system implementing a virtual reality space.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted that access services, such as providing access to virtual reality spaces and games of the current embodiments, delivered over a wide geographical area often use cloud computing. Cloud computing is a style of computing in which dynamically scalable and often virtualized resources are provided as a service over the internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the internet, based on how the internet is depicted in computer network diagrams and is an abstraction for the complex infrastructure it conceals.

A game server may be used to perform the operations of the durational information platform for video game players, in some embodiments. Most video games played over the internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game, gaming application, or virtual reality space may be developed for a specific platform and a specific associated controller device. However, when such a game or virtual reality space is made available via a game cloud system or a cloud system implementing the virtual reality space, the user may be accessing the video game or virtual reality space with a different controller device. For example, a game or virtual reality space might have been developed for a game console and its associated controller, whereas the user might be accessing a cloud-based version of the game or virtual reality space from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game or interaction in the virtual reality space.

In another example, a user may access the cloud gaming system or the cloud system implementing a virtual reality space via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game or the virtual reality space. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs or inputs for interaction in the virtual reality space. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs the detection of which does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the objects, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the telemetry and game state data are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Accordingly, the disclosure of the example embodiments is intended to be illustrative, but not limiting, of the scope of the disclosures, as set forth in the following claims. Although example embodiments of the disclosures have been described in some detail for purposes of clarity of understanding, it will be apparent that certain changes and modifications can be practiced within the scope and equivalents of the following claims. In the following claims, elements and/or steps do not imply any particular order of operation, unless explicitly stated in the claims or implicitly required by the disclosure.

What is claimed is:

1. A method for communicating with users in a virtual reality space, comprising:
   capturing images of a user during a session of interaction in the virtual reality space, the captured images of the user including hand gestures and facial expressions made by the user during a communication act;
   processing state data generated during the session, the state data used to identify a context associated with the virtual reality space during the communication act, the context associated with the virtual reality space including virtual objects and content items present in a scene of the virtual reality space during the communication act;
   generating an audio output representing an interpretation of the hand gestures and facial expressions made by the user during the communication act, the interpretation of the of the hand gestures and facial expressions made by the user includes processing using an interpretive learning model that uses the hand gestures and facial expressions made by the user and the context associated with the virtual reality space, the audio output includes sound modifications that are dynamically applied based on the context associated with the virtual reality space during the communication act, the sound modifications changing a characteristic of the audio output so that the interpretation of the communication act is substantially consistent with the virtual objects and content items present in the virtual reality space when the sound modifications are applied; and presenting the audio output in the virtual reality space via an avatar of the user, wherein a face of the avatar of the user is correspondingly modified with a video overlay associated with the sound modifications, wherein the sound modifications update during the communication act.

2. The method of claim 1, wherein the hand gestures made by the user include interactions with a controller used by the user, the interactions with the controller causing spatial and inertial motion of the controller, the spatial and inertial motion of the controller being detected using an inertial sensor of the controller.

3. The method of claim 2, wherein the captured images of the user are captured using a camera, and the captured images are used to detect spatial movement of the user's hands as the user makes hand gestures during the communication act.

4. The method of claim 3, wherein the camera is integrated into a head mounted display that performs inside-out tracking of the hand gestures made by the user, or the camera is placed in a real-world space having a point of view directed toward the user.

5. The method of claim 4, wherein a second camera of the head mounted display performs eye tracking, the eye tracking is used to identify the facial expressions made by the user during the communication act.

6. The method of claim 5, wherein a third camera of the head mounted display performs mouth tracking, the mouth tracking is used to identify the facial expressions made by the user during the communication act.

7. The method of claim 1, wherein the video overlay associated with the sound modifications has a mood template, and the mood template includes one of a happy mood, an excited mood, a rushed mood, a sad mood, an unhappy mood, or a stressed mood.

8. The method of claim 1, wherein the video overlay associated with the sound modifications is implemented by manipulating a mesh of a three-dimensional model of the face of the avatar.

9. The method of claim 1, wherein the characteristic of the audio output is a volume, a pace, a pitch, an inflection, or a tone of the audio output.

10. A non-transitory computer readable medium containing program instructions for communicating with users in a virtual reality space, wherein execution of the program instructions by one or more processors of a computer system causes the one or more processors to carry out the operations of:

capturing images of a user during a session of interaction in the virtual reality space, the captured images of the user including hand gestures and facial expressions made by the user during a communication act;

processing state data generated during the session, the state data used to identify a context associated with the virtual reality space during the communication act, the context associated with the virtual reality space including virtual objects and content items present in a scene of the virtual reality space during the communication act;

generating an audio output representing an interpretation of the hand gestures and facial expressions made by the user during the communication act, the interpretation of the of the hand gestures and facial expressions made by the user includes processing using an interpretive learning model that uses the hand gestures and facial expressions made by the user and the context associated with the virtual reality space, the audio output includes sound modifications that are dynamically applied based on the context associated with the virtual reality space during the communication act, the sound modifications changing a characteristic of the audio output so that the interpretation of the communication act is substantially consistent with the virtual objects and content items present in the virtual reality space when the sound modifications are applied; and presenting the audio output in the virtual reality space via an avatar of the user, wherein a face of the avatar of the user is correspondingly modified with a video overlay associated with the sound modifications, wherein the sound modifications update during the communication act.

11. The non-transitory computer readable medium of claim 10, wherein the hand gestures made by the user include interactions with a controller used by the user, the interactions with the controller causing spatial and inertial motion of the controller, the spatial and inertial motion of the controller being detected using an inertial sensor of the controller.

12. The non-transitory computer readable medium of claim 11, wherein the captured images of the user are captured using a camera, and the captured images are used to detect spatial movement of the user's hands as the user makes hand gestures during the communication act.

13. The non-transitory computer readable medium of claim 12, wherein the camera is integrated into a head mounted display that performs inside-out tracking of the hand gestures made by the user, or the camera is placed in a real-world space having a point of view directed toward the user.

14. The non-transitory computer readable medium of claim 13, wherein a second camera of the head mounted display performs eye tracking, the eye tracking is used to identify the facial expressions made by the user during the communication act.

15. The non-transitory computer readable medium of claim 14, wherein a third camera of the head mounted display performs mouth tracking, the mouth tracking is used to identify the facial expressions made by the user during the communication act.

16. The non-transitory computer readable medium of claim 10, wherein the video overlay associated with the sound modifications has a mood template, and the mood template includes one of a happy mood, an excited mood, a rushed mood, a sad mood, an unhappy mood, or a stressed mood.

17. The non-transitory computer readable medium of claim 10, wherein the video overlay associated with the sound modifications is implemented by manipulating a mesh of a three-dimensional model of the face of the avatar.

18. The non-transitory computer readable medium of claim 10, wherein the characteristic of the audio output is a volume, a pace, a pitch, an inflection, or a tone of the audio output.

* * * * *